United States Patent [19]

Bauer et al.

[11] Patent Number: 5,093,164

[45] Date of Patent: Mar. 3, 1992

[54] MULTIPLE LAYER PACKAGING SHEET MATERIAL

[76] Inventors: Frank T. Bauer, One Lawrence Ct., Appleton, Wis. 54911; Yong J. Kim, 1089 Eden Dr.; Roger P. Genske, 971 Nenning Rd., both of Neenah, Wis. 54956

[21] Appl. No.: 138,270

[22] Filed: Dec. 23, 1987

Related U.S. Application Data

[63] Continuation-in-part of Ser. No. 81,789, Aug. 5, 1987, abandoned, and a continuation-in-part of Ser. No. 802,910, Nov. 20, 1985, Pat. No. 4,764,404, and a continuation-in-part of Ser. No. 45,003, Apr. 30, 1987, and a continuation-in-part of Ser. No. 802,877, Nov. 29, 1985, Pat. No. 4,778,697.

[51] Int. Cl.$^5$ ............................................. B29D 22/00
[52] U.S. Cl. ................................... 428/35.4; 428/349; 428/412; 428/516; 428/517; 428/483; 428/476.3; 428/511; 428/518
[58] Field of Search ............... 428/412, 516, 349, 517, 428/35.4, 518, 476.3, 483, 511

[56] References Cited

U.S. PATENT DOCUMENTS

| | | | |
|---|---|---|---|
| 456,720 | 1/1886 | Yaeo et al. | |
| 2,762,720 | 9/1956 | Michel et al. | 117/65 |
| 2,993,876 | 7/1961 | McGlamery | 260/45.5 |
| 3,192,288 | 6/1965 | Sayko et al. | 260/897 |
| 3,455,720 | 7/1969 | Davies et al. | 117/7 |
| 3,572,721 | 3/1971 | Harrison et al. | 372/218 |
| 3,597,237 | 8/1971 | Nughes | 99/171 |
| 3,600,208 | 8/1971 | Abbott | 117/7 |
| 3,665,059 | 5/1972 | Mahlmann | 260/897 A |
| 3,701,702 | 10/1972 | Schichman et al. | 156/244 |
| 3,758,643 | 9/1973 | Fischer | 260/877 A |
| 3,793,283 | 2/1974 | Frailey | 260/336 AQ |
| 3,949,114 | 4/1976 | Viola et al. | 428/412 |
| 3,962,018 | 6/1976 | Costemalle et al. | 156/306 |
| 4,104,210 | 7/1978 | Coran et al. | 260/4 R |
| 4,112,181 | 9/1978 | Baird et al. | 428/336 |
| 4,140,162 | 2/1979 | Gajewski et al. | 150/1 |
| 4,147,827 | 4/1979 | Briedt et al. | 428/218 |
| 4,169,910 | 10/1979 | Graboski | 428/35 |
| 4,189,519 | 2/1980 | Ticknor | 428/476 |
| 4,194,039 | 3/1980 | Mueller | 428/213 |
| 4,210,686 | 7/1980 | Gajewski et al. | 428/35 |
| 4,230,767 | 10/1980 | Isaka et al. | 428/349 |
| 4,250,273 | 2/1981 | Bohm et al. | 525/99 |
| 4,291,092 | 9/1981 | Weiner | 428/349 |
| 4,294,889 | 10/1981 | Hashimoto | 428/515 |
| 4,309,466 | 1/1982 | Stillman . | |
| 4,311,742 | 4/1982 | Otsuka | 428/35 |
| 4,311,807 | 5/1982 | McCullough et al. | 525/197 |
| 4,322,465 | 6/1982 | Webster | 428/194 |
| 4,336,212 | 7/1982 | Yoshimura et al. | 264/22 |
| 4,350,795 | 9/1982 | Bohm et al. | 525/194 |

(List continued on next page.)

FOREIGN PATENT DOCUMENTS

| | | |
|---|---|---|
| 0093797 | 11/1983 | European Pat. Off. . |
| 0144642 | 6/1985 | European Pat. Off. . |
| 0165791 | 12/1985 | European Pat. Off. . |
| 0169654 | 1/1986 | European Pat. Off. . |
| 0229475 | 7/1987 | European Pat. Off. . |
| 0230115 | 7/1987 | European Pat. Off. . |
| 2415056 | 8/1979 | France . |
| 52-072744 | 6/1977 | Japan . |
| 54-103478 | 2/1979 | Japan . |
| 58-157839 | 5/1983 | Japan . |
| 1168541 | 10/1969 | United Kingdom . |
| 2055688 | 3/1981 | United Kingdom . |
| 1600250 | 10/1981 | United Kingdom . |
| 0052557 | 5/1982 | United Kingdom . |

OTHER PUBLICATIONS

Converting Magazine, Oct. 1987, pp. 40, 41, 42 and 44, "All-Plastic Pouch:Retortable & Microwaveable".
Food Processing Magazine p. 105 Jul. 1986.
Plastics World Magazine, Feb. 1987, p. 51.
Nippon Chemtec Consulting Report, received Apr. 1986.

*Primary Examiner*—Edith Buffalow

[57] ABSTRACT

Packaging sheet materials 10 and packages having improved impact/shock tolerance as measured in a slope drop test. The sheet materials comprise an impact layer 12 of a blend of polypropylene and a polymer providing elastomeric properties between a sealant substructure 14 and a substrate substructure 16.

64 Claims, 6 Drawing Sheets

U.S. PATENT DOCUMENTS

| | | | |
|---|---|---|---|
| 4,352,849 | 9/1982 | Mueller | 428/213 |
| 4,357,376 | 10/1982 | Nattinger et al. | 428/35 |
| 4,391,862 | 5/1983 | Bornstein et al. | 428/35 |
| 4,405,667 | 9/1983 | Christensen et al. | 428/35 |
| 4,407,877 | 10/1983 | Rasmussen | 428/905 |
| 4,424,253 | 1/1984 | Anderson | 428/215 |
| 4,438,850 | 3/1984 | Kahn | 206/634 |
| 4,440,815 | 4/1984 | Zomorodi et al. | 428/35 |
| 4,448,792 | 7/1984 | Schirmer | 426/113 |
| 4,472,227 | 9/1984 | Toyoda et al. | 156/244.11 |
| 4,475,241 | 10/1984 | Mueller et al. | 383/113 |
| 4,505,951 | 6/1985 | Kennedy | 427/55 |
| 4,515,836 | 7/1985 | Cobbs et al. | 427/425 |
| 4,528,220 | 8/1985 | Hwo | 428/35 |
| 4,568,723 | 4/1986 | Lu | 525/92 |
| 4,643,926 | 2/1987 | Mueller | 428/35 |
| 4,654,240 | 3/1987 | Johnston | 428/35 |
| 4,689,099 | 5/1987 | Ito et al. | 156/69 |
| 4,734,459 | 2/1988 | Cecchin et al. | 525/247 |
| 4,769,261 | 4/1988 | Hazelton | 428/35 |

MULTIPLE LAYER PACKAGING SHEET MATERIAL

This application is a continuation in part, under 35 U.S.C. 120, of application Ser. No. 081,789 filed Aug. 5, 1987, now abandoned; and a continuation in part of application Ser. No. 802,910 filed Nov. 20, 1985, now U.S. Pat. No. 4,764,404; and a continuation in part of application Ser. No. 045,003 filed Apr. 30, 1987; and a continuation in part of application Ser. No. 802,877 filed Nov. 29, 1985, now U.S. Pat. No. 4,778,697. Applications Ser. Nos. 081,789; 802,910; and 045,003 are herein incorporated by reference.

BACKGROUND OF THE INVENTION

This invention relates to multiple layer sheet materials, especially multiple layer packaging sheet materials which are used to fabricate packages through the formation of heat seals about the periphery of the package. The invention is particularly related to the ability of the packages to tolerate flexure of the package and to tolerate shock stresses generated by impact forces, as when the package is dropped. The preferred sheet materials of the invention include a functional capability to provide a barrier to transmission of one or more gases such as oxygen or water vapor.

In forming heat seals in such sheet materials, the amount of heat which is driven through the sheet material to the sealant layer to soften that layer sufficiently for formation of the heat seals, as a secondary and undesirable function, may be sufficiently intense to significantly soften an intermediate vinylidene chloride copolymer layer during the formation of the heat seals.

Packages made with conventional ones of such sheet materials, to the extent the overall thickness of the sheet material is less than about 0.38 mm., tend to be deficient in impact resistance; especially packages where such sheet materials are used as closure lids on formed trays. In such applications, the lid is the weakest member of the package, such that any failure of the package typically occurs in the lid sheet material adjacent the heat seal.

"Softening temperature" as used herein means any determinant and measurable temperature which identifies a condition at which the polymer experiences a change which tends to make it more fluid, and subject to flowing at normal conditions used in forming heat seals. While the DSC melting point is generally intended herein, other tests could equally well be used so long as they are applied equally to all the layers being compared.

It is an object of this invention to provide improved multiple layer sheet materials wherein there is provided an impact layer having elastomeric properties and an improved impact tolerance in the resulting sheet material, such that the impact tolerance of the package is improved.

It is especially an object to provide increased impact tolerance at the heat seal locus, while maintaining the ability, in the sheet materials, to form heat seals sufficiently strong to maintain the integrity of the seal throughout the intended use life of the package until it is intentionally opened.

SUMMARY OF THE INVENTION

These and other objects of the invention are attained in a multiple layer sheet material comprising a first sealant sheet structure comprising polypropylene, a second substrate structure comprising at least one polymeric layer, and an impact layer disposed between the first sealant sheet structure and the second substrate structure. The composition of the impact layer comprises a first component including a polypropylene polymer and, as a second component, a polymeric composition providing elastomeric properties to the impact layer and increased shock tolerance to the multiple layer sheet material. The at least one polymeric layer in the second substrate structure is disposed toward the impact layer.

In preferred embodiments of the invention, the second component of the impact layer comprises either an ethylene butene-1 copolymer containing 85% to 95% ethylene, or a polyisobutylene. Especially preferred embodiments include, as a third component of the impact layer, a second polymeric component providing elastomeric properties to the impact layer and shock tolerance to the multiple layer sheet material. Typically that component itself is generally recognized as possessing elastomeric properties.

In certain embodiments, and especially where a peelable seal property is desired, the first sealant sheet structure comprises a combination of polypropylene and a polyethylene having a density of at least about 0.930, preferably at least about 0.940, most preferably at least about 0.950, referred to herein as high density polyethylene (HDPE). The HDPE serves as a modifier to the polypropylene to control the strength of heat seals formed with the sheet material.

In certain embodiments of the invention, and especially (but not only) those embodiments where the primary polymer in the sealant sheet structure is modified to reduce the seal strength, the sheet material exhibits improved shock/impact tolerance when the sealant sheet structure comprises, as a third component, a polymer selected from the group consisting of polyisobutylene and ethylene butene-1 copolymer containing 85% to 95% ethylene.

In certain embodiments of the invention, the substrate structure comprises a layer which provides, for the overall sheet material, an oxygen transmission rate of no more than about 5 cm/m² day at 23° C., 0% relative humidity.

In certain embodiments, the substrate structure includes a layer which provides for the overall sheet material a moisture vapor transmission rate of no more than about 2 cm/m² day at 100% relative humidity.

In some embodiments, the sheet material is comprised entirely of extensible materials, such as unoriented polymers. In other embodiments, the sheet material, preferably in the substrate structure, includes one or more layers of a less extensible, and more dimensionally stable, material. Such layers may comprise, for example, paper or a molecularly oriented polymer layer such as a biaxially oriented layer of nylon, polypropylene, or polyethylene terephthalate. Other materials which are highly suitable for use in the substrate structure are polycarbonates and vinylidene chloride copolymers.

In certain embodiments, and especially those incorporating a more dimensionally stable layer, the sheet material includes, between the sealant sheet structure and the impact layer, a layer which provides for the overall sheet material an oxygen transmission rate of no more than about 2 cc/m² day.

The sheet materials of the invention are suitable for use in fabrication of packages.

DETAILED DESCRIPTION OF THE ILLUSTRATED EMBODIMENTS

The applicants herein have discovered that an impact layer characterized by certain base polymer selection and modified by elastomer-providing polymeric materials, can increase the shock/impact tolerance, and to some extent, the flexural properties, of a sheet material having a sealant structure on one side of the impact layer and a substrate structure on the other side of the impact layer.

Figure 1:
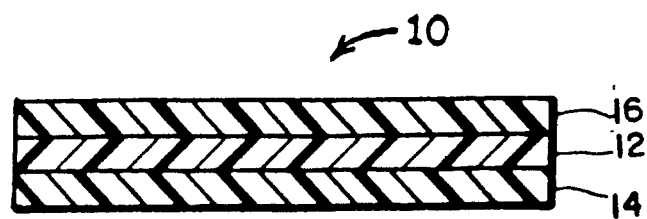
FIG. 1 is a cross-section of a sheet material of the invention, showing generally the substrate structure, the sealant structure, and the intermediate impact layer.

Referring to FIG. 1, the sheet material 10 has an impact layer 12 disposed between sealant structure 14 and substrate structure 16.

Figure 2:
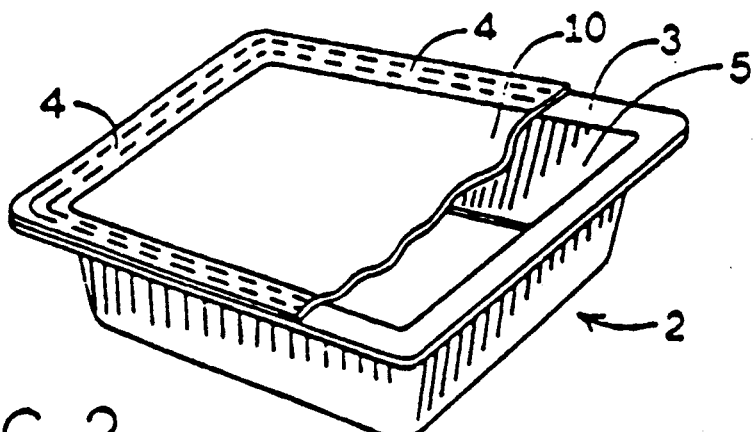
FIG. 2 shows a pictorial view partially cut away of a tray package which is closed with a lid made with sheet material of this invention.

FIG. 2 shows generally how the flexible sheet materials of the invention are used as lid material in closure of preformed semi-rigid trays 2 as illustrated in FIG. 2. The sheet materials of the invention can also be used as the entire packaging structure, such as in formation of a pouch as at 4 in FIG. 3, by bringing portions of the sheet material 10 into facing relationship about a common space and forming heat seals as at 6 in facing portions of sealant structure 14. After a product has been placed in the pouch through opening 8, the remaining open side is sealed closed in complete fabrication of the filled, closed, and sealed packages.

The primary problem being addressed by the inventors herein is provision of a sheet material for preformed, semi-rigid trays such as the try 2 seen in FIG. 2, and especially trays which are to be subjected to high thermal stresses, such as processing temperatures in the range up to about 121° C. Such conditions are commonly encountered in the retort processing of such products as food and medical supplies. This invention is directed at providing lid sheet material for such uses.

It is known to use a sheet material of the order of

/PET/Saran/PP sealant/ as a lid material. But packages made with such lid material are deficient in impact resistance. In pending parent application Ser. No. 081,789 filed Aug. 5, 1987, there is disclosed the use of a second (interior) layer of PET, whereby the basic structure of the sheet material is /PET/Saran/PET/PP sealant/, and wherein the sum of the thicknesses of the two layers of PET in the 4-layer sheet material is the same as the thickness of PET used in the foregoing 3-layer sheet material. And while improvement in impact resistance of the completed package is achieved thereby, and as taught therein, still further improvement, especially in impact resistance is desirable.

Referring to the above 3l-layer and 4l-layer structures, it is seen that those sheet materials generally comprise a substrate substructure and a sealant layer. The sealant layer may, of course, comprise a plurality of layers as disclosed in application Ser. No. 045,003, filed Apr. 30, 1987.

In this invention, an impact layer 12 is interposed into the sheet material structure between the sealant substructure 14 and the substrate substructure 16. Both the sealant substructure 14 and the substrate substructure 16 are shown in FIG. 1 as single layers for simplicity of comprehending the structural concept of the invention. As will be seen hereinafter by illustration and discussion, either substructure 14 or 16, or both, may be either a single layer of a plurality of layers.

Figure 4:
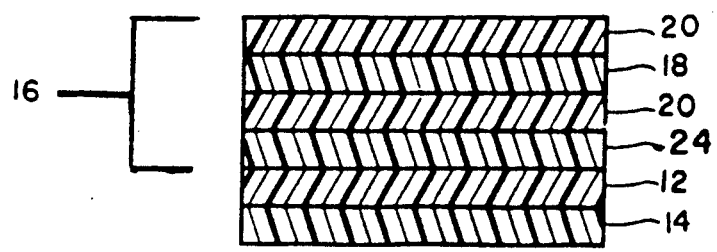
FIGS. 4-15 show cross-sections of various exemplary sheet materials of the invention.

FIGS. 4-15 illustrate specific examples of sheet structures of the invention. Referring to FIG. 4, layer 12 is the impact layer and layer 14 is a single layer sealant structure comprising polypropylene. The substrate substructure 16 comprises an oxygen barrier layer 18 of ethylene vinyl alcohol copolymer (EVOH), or polyvinyl alcohol (PVOH), between two layers 20 of nylon, and an adhesive layer 24. The vinyl alcohol of layer 18 is of the type generally capable of providing good oxygen barrier. Other oxygen barrier materials can, of course, now be designed into the substrate 16. Layers 20 may be any of the nylons generally processible with the selected vinyl alcohol, but are preferably nylon 6. The composition of adhesive layer 24 is selected with respect to the specific compositions chosen for layers 12 and 20, such that it will serve satisfactorily its bonding function. Generally representative of extrudable resins acceptable for layer 24, and which will usually accommodate coextrusion of the entire sheet material, are the anhydride modified extrudable adhesive resins. Preferred extrudable resins will have strong adhesion to both layer 12 which contains a major component of polypropylene—at least 40%—and nylon layer 20. Exemplary of acceptable such resins is the polypropylene-based Admer series of resins from Mitsui Petrochemical, such as QF 500: QF 550: and QF 551. Alternatively, layer 24 may represent an adhesive laminant such as a urethane adhesive. Sheet materials illustrated by FIG. 4 generally have an oxygen transmission rate of no more than 5 cm$^3$/m$^2$ day at 23° C., 0% relative humidity (RH).

Figure 5:
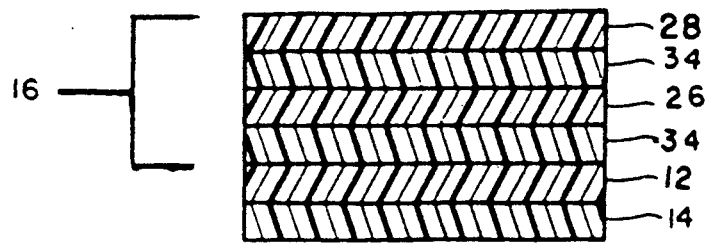

Referring now to FIG. 5, layer 12 is the impact layer. Layer 14 is the sealant layer comprising polypropylene. Layer 26 is a vinylidene chloride copolymer. Layer 28 is polyethylene terephthalate (PET). The impact tolerance of such a structure can be improved by incorporating a second layer of PET in the position illustrated as layer 12 in FIG. 5, as disclosed in copending application Ser. No. 081,789. In this invention, an improved impact tolerance is obtained by the use of the elastomer-modified polypropylene-based layer 12. Sheet materials illustrated by FIG. 5 generally have an oxygen transmission rate of no more than 3 cm$^3$/m$^2$ day.

Figure 6:
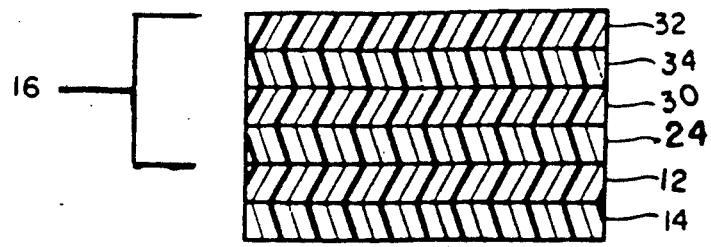

Referring to FIG. 6, layers 12 and 14 are the impact and sealant layers respectively. Substrate substructure 16 comprises layers 24, 30, 32, and 34. Layer 30 is a polyetheramide copolymer or a blend of polyetheramide and EVOH, in enhancement of oxygen barrier properties. Layer 32 is oriented PET, providing an abuse resistant outer layer which is tolerant of high temperature. Layers 24 and 34 are adhesives suitable for bonding together the respective layers at their corresponding interfaces. Layer 34 may be, for example, a curing type urethane adhesive such as Adcote 76T198 from Morton Chemical Company, as can layer 34 in the embodiment of FIG. 5. Layer 24 may be, for example, Admer 550.

Figure 7:
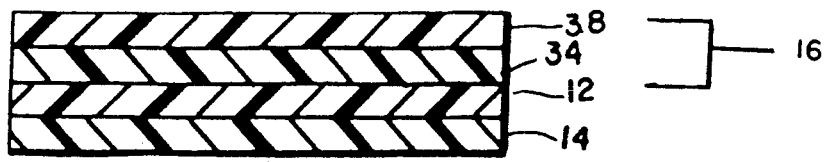

FIG. 7 illustrates a rather uncomplicated example of the invention. Layers 12 and 14 are the impact and sealant layers respectively. Layer 38 is high density polyethylene (HDPE). Layer 34 is an adhesive such as Adcote 76T198. The substrate 16 comprises layers 34 and 38. The HDPE in layer 38 provides a low moisture vapor transmission rate, less than 2 cm$^3$/m$^2$ day at 100% RH.

It is seen that layers illustrated as having common, or substantially similar compositions and structures, are numbered herein similarly throughout the several illustrations.

Figure 8:
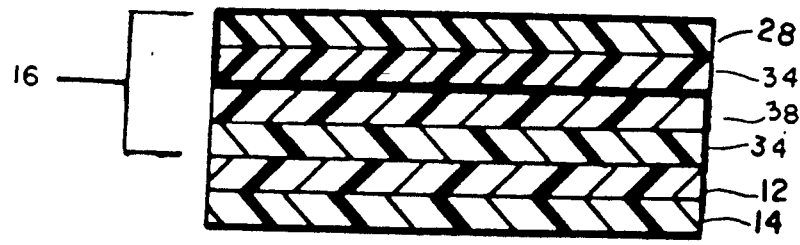

Turning now to FIG. 8, layers 12 and 14 are the impact and sealant layers respectively. Layer 28 is PET in provision of an abuse resistant, high temperature tolerance outer layer, layer 38 is HDPE which provides a low moisture vapor transmission rate. Layers 34 are adhesives generally of the curing type urethane such as Adcote 76T198. Substrate substructure 16 includes layers 28, 38, and both adhesive layers 34.

Figure 9:
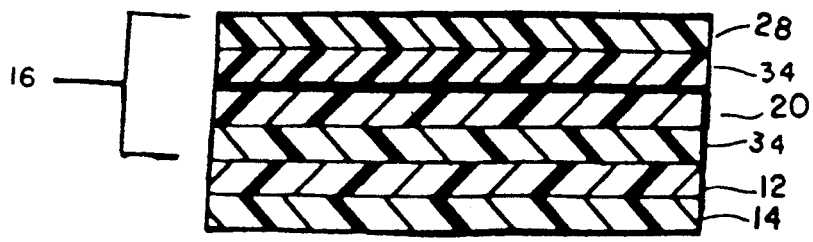

FIG. 9 illustrates a tough, abrasion resistant structure. Layers 12 and 14 are the impact and sealant layers respectively. Layer 28 is PET. Layer 20 is a polyamide. Layers 34 are adhesives such as Adcote 76T198. Layer 20 may include an EVOH in blend composition. Substrate 16 includes layers 20, 28, and both adhesive layers 34.

Figure 10:
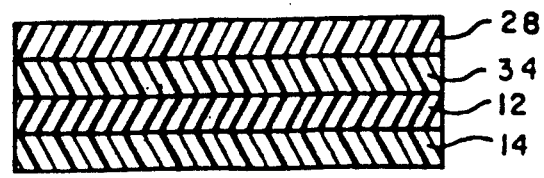

FIG. 10 illustrates another simple structure of the invention in which substrate 16 comprises a layer 28 of PET and adhesive layer 34. Layers 12 and 14 respectively represent the impact and sealant layers.

Figure 11:
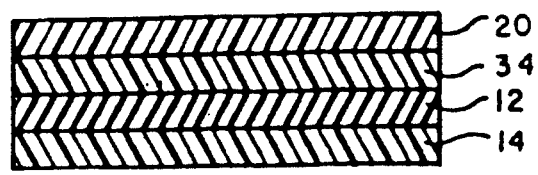

In FIG. 11, layers 12 and 14 are the impact and sealant layers, respectively. Layer 20 is nylon, especially a barrier nylon such as Selar PA from DuPont or MXD6 from Mitsubishi Gas Chemical Company; or a polyacrylonitrile. Layer 34 is an adhesive such as Adcote 76T198. Substrate 16 comprises layers 20 and 34.

Figure 12:
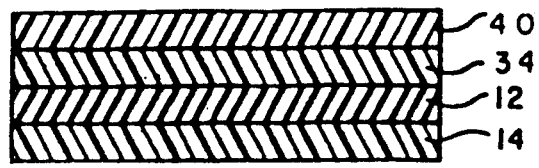

In FIG. 12, layers 12 and 14 are the impact and sealant layers, respectively. Layer 40 is polycarbonate. Layer 34 is an adhesive such as Adcote 76T198. Substrate 16 includes layers 34 and 40.

Figure 13:
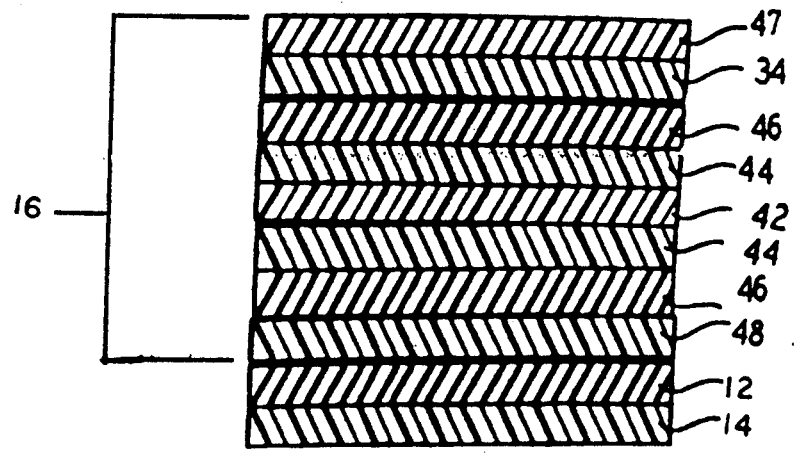

In FIG. 13, layers 12 and 14 are the impact and sealant layers respectively. Layer 42 of paper provides a readily printable surface, for presenting a graphic message. Two primer layers 44 of ethylene acrylic acid copolymer (EAA) bond the fibrous paper layer 42 to two respective layers 46 of low density polyethylene (LDPE). Layer 34 is an adhesive such as Adcote 76T198. Layer 47 is oriented polypropylene (OPP). Substrate 16 includes layer 42, two layers 44, two layers 46, adhesive layer 48 which bonds one LDPE layer 46 to the impact layer 12, adhesive layer 34 and OPP layer 47. Adhesive layer 48 should bond well to both the LDPE of layer 46 and the composition, especially polypropylene, of layer 12. An example of a commercially available adhesive suitable for layer 48 is AP220L, an anhydride modified LDPE-based adhesive from Mitsubishi Chemical Industries.

Figure 14:
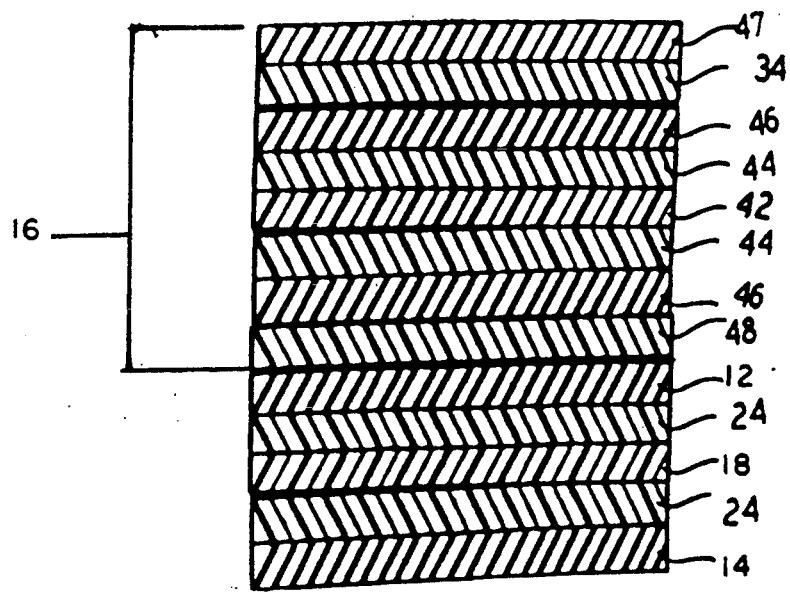

In FIG. 14, layers 12 and 14 are the impact and sealant layers and are separated from each other by a layer 18 of EVOH, which is bonded to layers 12 and 14 by two extrudable adhesive layers 24 of, for example, Admer 550. In this structure, layer 18 of EVOH and the adhesive layers 24 are not functionally part of either impact layer 12, sealant layer 14, or substrate 16. Substrate 16 comprises layer 42 of paper, two layers 44 of EAA, two layers 46 of LDPE, adhesive layer 48 as of AP220L, adhesive layer 34 and OPP layer 47.

Thus it is seen that the sheet materials of the invention may include, in addition to the three primary functional groupings of 12, 14, and 16, further layer structuring. In this case, the EVOH provides a gas barrier between the sealant layer 14 and the impact layer 12.

In FIGS. 4–14, the sealant structure 14 has been illustrated as a single layer 14. In any of the sheet materials of this invention, however, it is contemplated that the sealant substructure can be a plurality of layers.

Figure 15:
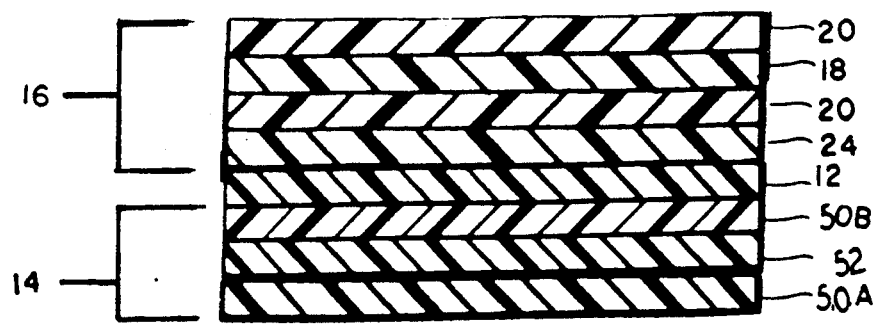

Thus FIG. 15 shows the sheet material of FIG. 4, but wherein the sealant substructure 14 comprises a 3-layer substructure, comprising two layers 50A and 50B of polypropylene, optionally elastomer-modified such as with a polyisobutylene or an ethylene butene-1 copolymer containing 85% to 95% (mole) ethylene, and a layer 52 of a blend of polypropylene (40% to 70% by weight, preferably 50% to 60%) and HDPE, the layer 52 composition being optionally elastomer-modified (2% by weight up to 40%) such as with a polyisobutylene or an ethylene butene-1 copolymer containing 85% to 95% ethylene. The outer polypropylene layer 50A is subject to contact with other surfaces and objects and so its elastomer-modification content is generally limited to about 10% by weight to avoid tackiness and associated blocking, although up to about 20% can be used with certain elastomers. Interior polypropylene layer 50B is not so subject to external contacts, and so may be more highly modified, i.e. up to 30% or 40% modifier, and indeed may take on many of the properties of impact layer 12, such that it may assist layer 12 is achieving impact/shock tolerance properties for the sheet material.

So layer 50A is specially adapted to creating a band having a desired strength with a facing surface such as the flange 3 of tray 2 (FIG. 2). Layer 52 is especially adapted for cohesive failure when a strong opening force is applied. Layer 50B is a bridging, compatibilizing, or adhesion-promoting layer, or a combination of those, to enhance the interfacing and joining of sealant structure 14 into the balance of the sheet material. And the composition of layer 50B may include an elastomer-providing component which cooperates with layer 12 in providing impact/shock tolerance to the sheet material. Any of the elastomers which are acceptable for use in layer 12 will be acceptable for use in layer 50B, albeit usually in a lesser fraction.

Reflecting, now, on the overall composite of the disclosure with respect to FIGS. 4–15, it is seen that the substrate 16 can take on a wide variety of configurations: and that it is limited functionally with respect to compatibility, for use in the sheet materials of the invention, only by its ability to be flexible, or semi-flexible, with thicknesses of 0.025 mm. to 2 mm., preferably 0.05 mm. to 0.50 mm., and its ability to be bonded to the adjacent layer in the sheet material as at impact layer 12. To the extent the sheet material is intended for high temperature use, such as retort conditions of up to about 121° C., then the composite of the materials used in substrate 16 desirably are selected to have tolerance for exposure to such temperatures.

The impact layer 12 generally comprises, as a base polymer, polypropylene. In some respects, the polypropylene of layer 12 may be considered as a portion of the material used in fabrication of the heat seal, or in holding cohesively together the materials used in forming the heat seal, especially where sealant structure 14 is a single layer. Since layer 12 is intended generally to serve the properties of lending impact tolerance and flexural capabilities to the sheet material, preferably the polypropylene selected for use in layer 12 is of a less crystalline nature compared to other polypropylenes, has a lower softening temperature, and compositionally includes at least a fractional amount of ethylene as a copolymer, preferably on the order of about 2% to about 5% ethylene. In any event, the polypropylene used in the layer 12 composition should have the capability to withstand the temperatures to which the sheet material is to be subjected without excessively thinning, especially during the fabrication of heat seals. Therefore the ethylene comonomer in the propylene used for layer 12 is usually of a minor amount.

Thus any of the polypropylenes may be used as the first component of the combination in the composition of layer 12. Polypropylenes which are copolymers having about 2 to about 5 mole percent ethylene are preferred, as the copolymer provides some minimum level of additional resilience to polypropylene as compared to a homopolymer, Nonetheless, the term "polypropylene" as used herein with respect to layer 12 is intended to include homopolymers and copolymers except where specified otherwise, since the primary impact tolerance of the sheet material is not so much dependent on the polypropylene as it is on the one or more elastomer-modifying components. Polypropylene is, of course, known in the art as a polymer which does not exhibit properties generally recognized as elastomeric properties. Whether the polypropylene is a homopolymer or copolymer, its resilience is enhanced substantially by the incorporation of the elastomeric component. Without the incorporation of the elastomeric component, layer 12 is incapable of performing its intended function of providing flexural properties and improved impact/shock tolerance to the sheet material.

For example, a blend, for layer 12, of 60% by weight of polypropylene and 40% polyisobutylene is superior to the same polypropylene in an unblended composition. Similarly, a blend of 65% by weight polypropylene and 35% by weight ethylene butene-1 copolymer containing about 90% ethylene is superior to the same polypropylene in an unblended composition.

Figure 3:
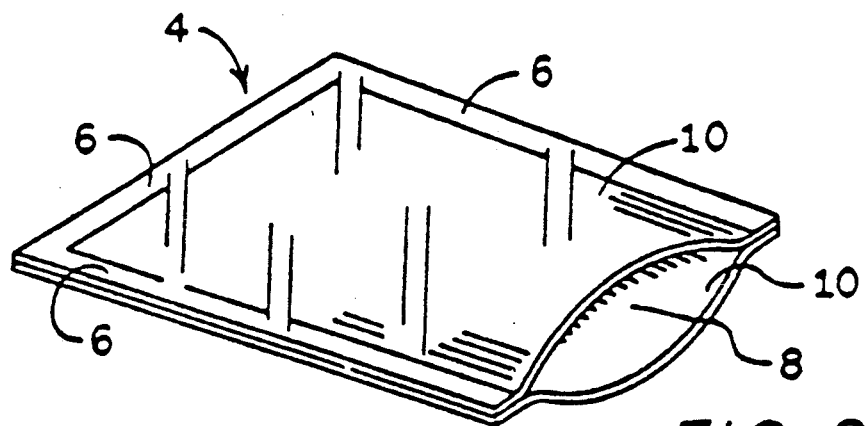
FIG. 3 shows a pictorial view of a pouch made with sheet material of this invention.

Further improved performance of layer 12 is the sheet materials of this invention, and especially as respects impact tolerance of the sheet material when fabricated into a package as illustrated in FIGS. 2 and 3, is sometimes seen when the polypropylene is combined with two materials, as disclosed herein, which provide elastomeric properties. Generally the polypropylene is present in an amount of about 40% to about 70%, preferably about 50% to about 60% by weight of layer 12. A lower level of about 40% is generally preferred in order to maintain at least a minimum degree of the high temperature tolerance of the composition which is provided by the polypropylene. An upper level of about 70% is generally desired in that a minimum amount of about 30% of the material providing the elastomeric properties is generally preferred in order to attain the impact tolerance desired of the sheet material of the invention. In some cases, however, greater than 70% of the composition may be polypropylene, where the properties of the polypropylene enhance a particular need of the sheet material for the end use intended and/or where other layers assist in provision of impact/shock tolerance, such as, for example, layer 50B of FIG. 15. It should be noted, however, that where the polypropylene is greater than 70% of the composition of layer 12, less of the shock tolerance and flex properties may be evident in the sheet material unless compensated by properties of other layers. In some cases, the layer 12 composition may contain up to as high as 90% polypropylene, with only the remaining 10% of the composition of layer 12 comprising the material providing elastomeric properties. While the incorporation of virtually any amount of the second component (namely the material providing elastomeric properties) into the composition will provide some benefit, generally improvement in the impact tolerance and the flexural properties of the sheet material are first evident at a level of about 10% by weight elastomer. Up to about 60% of the second component providing elastomeric properties may be used. The most desired balance of properties is generally achieved when the material providing elastomeric properties is present in an amount of about 30% to about 60% by weight.

Where the third component, which is the second material providing elastomeric properties, is used in layer 12, the third component is generally present in an amount which represents a ratio of about 1/6 to about ⅔ of the second component. While it is entirely possible that the elastomeric components be present in up to equal amounts, generally the greatest improvements in the impact/shock tolerance and flexural properties are seen where one component is present in a greater amount than the other.

While the use of only one modifier providing elastomeric properties in layer 12 does provide a significant level of improvement in the impact tolerance of the sheet material and its flexural properties, and its simplicity is advantageous, further improvements are observed in some embodiments when the impact layer includes two elastomer modifiers. The composition of layer 12 thus may include at least three components; the base polypropylene polymer, the first elastomer modifier, and the second elastomer modifier. The relationship among the three components is a mystery, in that the use of the second and third components as defined herein may provide a blend having superior properties as compared to a blend comprised of only two components, but having the same total amount of elastomer modifier. Thus, the most preferred family of some of the compositions of layer 12 is that which includes three components, within the ranges specified.

In addressing the technical issues surrounding the composition of sealant layer 14, it is seen that heat tolerance and heat stability are important to the functioning of the sheet material in high temperature environments. For those applications requiring these parameters, propylene polymers are seen to be excellent for tolerating the severe processing conditions. Also, the sealability of propylene polymers to, for example, formed trays having a propylene based surface, is excellent. To the extent propylene homopolymer or propylene copolymer is used by itself as the sealant substructure 14 for sheet material 10, the adhesion between sealant substructure 14 and flange 3 of the tray as seen in FIG. 2, and the cohesive strength of sealant substructure 14, are so strong that the ability to open the package may be impeded.

The applicants herein have found a particularly advantageous capability to control the peel strength of seals made with the sheet material, while providing an acceptably strong seal for protecting the contents on the interior of the package. This capability is achieved by providing a special family of blend compositions of propylene polymers for at least one layer of sealant substructure 14. In general, this special family of blend compositions is a combination of about 65% to about 95% by weight of a propylene homopolymer or copolymer and conversel; about 35% to about 5% of an ethylene polymer or copolymer, having a density of at least about 0.930, preferably at least about 0.940, most preferably at least about 0.950, and referred to herein as a high density polyethylene (HDPE) as seen at layer 52 in FIG. 15. The special blend compositions can also be used in any of the single layer sealant substructures 14, as in the embodiments illustrated in FIGS. 4–14. To the extent the propylene polymer is a homopolymer or copolymer containing up to about 5 percent ethylene, the larger fractions of HDPE are preferred in the bland composition, up to about 40% HDPE. To the extent the propylene polymer contains more ethylene, such as containing 20% ethylene and 80% propylene, then smaller fractions of HDPE are preferred in the bland composition, such as 10%.

In general, as increasing amounts of propylene are used in the composition of layer 14, the force required to peel the package open becomes commensurately greater. To the extent that the sheet material 10 has excellent interlayer adhesion and appropriate layer cohesive strengths, these greater peel strengths are acceptable, and thus up to about 90% propylene polymer may be used. To the extent the interlayer adhesion within sheet material 10 is of a lesser degree, using high amounts of propylene (for example over 80% of a copolymer having 95% or more propylene) can result in delamination within the sheet material 10 when an attempt is made to peel sheet material 10 from the closed and sealed package. Thus where interlayer adhesions are more moderate, it is desirable to use less propylene polymer in the blend, and respectively more ethylene. Preferred compositions range between about 65% and about 75% by weight propylene and about 35% to about 25% HDPE. As the fraction of propylene polymer decreases below about 65%, the strength of the seal fabricated with layer 14 may be reduced to the point where shock/impact resistance of the sealed package is reduced and the preferred seal strength is not achieved.

The adhesion between the layers in sheet material 10 is affected by the tendency of the sheet material to elongate under elongation stresses. It can also be affected by compression of one or more of the layers during the heat sealing process. To the extent the sheet material can be elongated, the elongation puts stresses on the interfaces between the several layers, as each of the differing individual layers responds to the stresses somewhat differently, and according to the properties of its own composition. This tends to stress the interfaces, and thus to weaken the adhesion at those respective interfaces. Layer compression has a similar effect, in applying lateral and longitudinal stresses to layer interfaces.

Thus those sheet structures 10 which can be elongated, or undergo significant compression during heat sealing, generally work best when they are combined with a sealing layer 14 which comprises a blend of propylene and ethylene polymers in the lower end of the range of propylene polymer, wherein the lid can be peeled off with more modest forces. On the other hand, since higher fractions of propylene polymer do yield packages having stronger seals and stronger cohesion in layer 14, higher fractions of propylene polymer are preferred where their use can be tolerated. Thus the amount of propylene polymer in the blend of layer 14 is generally in the higher end of the range for those sheet materials which have less extensibility, such as those materials containing a layer of paper.

The amount of HDPE used in the composition of layer 14 is preferably selected with reference to the nature of the propylene polymer which is contemplated for use in the composition, and the adhesive and cohesive strengths in and between the several layers in the sheet material. A relatively larger amount of HDPE is used in the blend where the propylene content of the propylene polymer is in the upper portion of its range. To the extent the amount of propylene in the propylene polymer is reduced, lesser amounts of HDPE are used in the composition. In most cases, the propylene polymer is a copolymer having at least a small amount of ethylene, i.e. 2%, in its composition.

With respect to the composition of layer 14 comprising the base polymer of, for example, polypropylene and a modifying material, such as high density polyethylene, for reducing the strength of the seal formed by layer 14, the percentages used herein are used only with respect to those two components. To the extent a third component, such as, for example, a component providing elastomeric properties is incorporated into layer 14, the fractional compositions recited for the base polymer and the modifying polymer are not altered according to the incorporation of the elastomer. Rather, the fraction of the elastomer is considered with respect to the overall composition of layer 14. To that end, the composition of, for example, 65% propylene polymer and 35% HDPE may be blended with an elastomeric material such as a polyisobutylene, or an ethylene butene-1 copolymer as earlier recited. A preferred blend for the composition of layer 14 comprises, for example, 20% of an elastomeric component, and 80% of the composition of the base polymer and the modifying polymer, wherein the base polymer is about 65% and the modifying polymer about 35% of that subcombination of 80%.

FIG. 2 illustrates generally the functioning of the sheet material of the invention as a lid on a tray 2. In sealing of the sheet material 10 to the tray 2, sealant substructure 14 is joined to flange 3, and thus comprises the sealant layer as previously discussed. As the sheet material 10 is peeled from the tray flange in opening the tray, a tearing typically occurs in sealant substructure 14 where the sealant substructure is sealed, as at 7, to the flange 3, to thus provide access to the interior 5 of the container. The peeling of the sheet material 10 away from flange 3 is usually accompanied by a tearing in sealant substructure 14 which comprises a cohesive failure in sealant substructure 14 in the area of the seal 7 at flange 3, especially where a modifying material such as HDPE is used as a component of at least one of the layers in sealant substructure 14. In some cases, however, the sealant substructure 14 peels cleanly away from the sealed area 7 at flange 3 without leaving any significant portion of layer 14 on the flange. Typically, though, the removal of sheet material 10 from the package by way of peeling it from flange 3 results in a separation of substructure 14 in the seal area 7 such that a first portion of substructure 14 remains on the flange and a second portion is removed with the sheet material 10.

The invention has been described herein with respect to the required components of the sheet material 10 being impact layer 12, sealant substructure 14, and substrate 16. However, as illustrated in FIG. 14, the invention is entirely functional if additional layers of material are used between layers 12 and 14, so long as the advantageous properties of impact tolerance and flexural properties provided by layer 12, and appropriate inter-layer adhesions, are maintained. Likewise, additional layers may be used elsewhere in the sheet material.

EXAMPLE 1

A six layer sheet material as shown in FIG. 5 is made as follows. Polyethylene terephthalate film 0.024 mm. thick is adhesively laminated using Adcote 76T198 adhering to a film of vinylidene chloride vinyl chloride copolymer which is 0.025 mm. thick. The vinylidene chloride copolymer film is obtained from Dow Chemical Company as HB-100. The polyethylene terephthalate is Mylar from DuPont. An impact/sealant composite structure is then fabricated by coextruding impact layer 12 and sealant layer 14 in an air cooled blow tubular coextrusion process. The composition of layer 14 is 70% of a polypropylene polymer, containing about 2.7% ethylene and 30% of an HDPE having a density of 0.958. The composition of layer 12 is 56% polypropylene, about 33% polyisobutylene, and about 11% of an ethylene butene-1 copolymer. Layer 14 is approximately 0.025 millimeter thick. Layer 12 is approximately 0.08 mm. thick. Layer 12 is adhesively laminated to layer 26 using Adcote 76T198. The resulting sheet material is thus about 0.16 mm. thick.

COMPARATIVE EXAMPLE 1

A sheet material is made as in EXAMPLE 1 except that the impact layer is replaced by a 0.025 mm. thick layer having the same composition as the sealant layer. The resulting sheet material is thus about 0.16 mm. thick.

EXAMPLE 2

A sheet material is made as in EXAMPLE 1 except that the substrate 16 of FIG. 4 is used in place of the 4-layer substrate 16 (layers 26 and 28) of FIG. 5. In this example, the entire 6-layer structure is obtained by a single coextrusion process. Layer 18, about 0.01 mm. thick, is EVOH containing 29% ethylene. Layers 20 are nylon 6, about 0.025 mm thick each. Extrudable adhesive layer 24 is Admer QF-550 and is just thick enough to provide good adhesion, at about 0.005 mm.

EXAMPLE 3

A sheet material is made as in EXAMPLE 1 except that the substrate 16 of FIG. 6 is used in place of the 4-layer substrate of FIG. 5. In this example, the layers 12, 14, 30 and 24 are coextruded. Layer 30 is a blend of 50% PEBAX 5512 from ATO CHEMIE and 50% Nippon Gohsei EVOH Soarnol ET containing 38% (mole) ethylene; layer 30 being 0.012 mm. thick. Extrudable adhesive layer 24 is Admer QF-550 and is just thick enough to provide good adhesion, at about 0.004 mm.

EXAMPLE 4

A sheet material is made as in EXAMPLE 1 except that the substrate 16 of FIG. 7 is used in place of the 4-layer substrate of FIG. 5. In this example, a single layer of HDPE 0.025 mm. thick is laminated to the impact layer using Adcote 76T198 adhesive.

EXAMPLE 5

A sheet material is made as in EXAMPLE 4 except that a layer of oriented PET 0.012 mm. thick, obtained as Mylar from DuPont Company, is adhesively laminated to the HDPE layer using the 76T198 adhesive, to thus make a sheet material as illustrated in FIG. 8.

EXAMPLE 6

A sheet material is made as in EXAMPLE 5 except that a layer of polyamide 0.025 mm. thick is used in place of the HDPE layer to make a sheet material as illustrated in FIG. 9. The polyamide used to make the samples are Selar PA from DuPont and MXD6 from Mitsubishi Gas Chemical.

EXAMPLE 7

A sheet material is made as in EXAMPLE 4 except that a layer of oriented PET 0.024 mm. thick, obtained as Mylar from DuPont Company, is used in place of the HDPE layer, to make a sheet material as illustrated in FIG. 10.

EXAMPLE 8

A sheet material is made as in EXAMPLE 7 except that a layer of polyamide 0.024 mm. thick is used in place of the HDPE layer to make a sheet material as illustrated in FIG. 11. Polyamide materials used to make the samples are Selar PA from DuPont and MXD6 from Mitsubishi Gas Chemical. Samples are also made using polyacrylonitrile.

EXAMPLE 9

A sheet material is made as in EXAMPLE 8 except that the entire sheet material is made as a coextrusion using Admer QF-550 extrudable adhesive in place of 76T198.

EXAMPLE 10

A sheet material is made as in EXAMPLE 8 except that a layer of polycarbonate 0.012 mm. thick is used in place of the polyamide layer, to make a sheet material as illustrated in FIG. 12.

EXAMPLE 11

A sheet material is made as in EXAMPLE 1 except that the substrate 16 is that illustrated in FIG. 13. Thus a layer of paper 42 at 65 gm/m$^2$ is extrusion laminated on both surfaces to layers of LDPE 0.025 mm. thick using, as the extrusion laminate, primer coatings of EAA on each side of the paper, to thus make a 5-layer substructure of LDPE/EAA/Paper/EAA/LDPE. This 5-layer substructure is then extrusion laminated to the impact layer using a Mitsubishi Chemical Company Industries extrudable adhesive AP 220L, which is an anhydride modified low density polyethylene, to thus make a sheet material as illustrated in FIG. 13. A layer of OPP, 0.012 mm. thick was laminated to the outer layer of LDPE using Adcote 76T198.

EXAMPLE 12

A sheet material is made as in EXAMPLE 11 except that the impact layer and the sealant layer are separately fabricated and a 0.012 mm. layer of EVOH containing 31 mole percent ethylene was interposed between the sealant layer and the impact layer. Extrudable adhesive Admer Qf-550 was used on both sides of the EVOH to bond the EVOH to the respective impact and sealant layers.

EXAMPLE 13

A sheet material is made as in EXAMPLE 2 except that a 3-layer sealant substructure is used in place of the single sealant layer used in EXAMPLE 2. The 3-layer sealant substructure is formed by coextrusion, along with the impact layer. The interior layer 52 of the sealant substructure is compounded by mixing together pellets of 2 parts polypropylene containing 2.7% ethylene as random copolymer and 1 part HDPE, density 0.958, to make a base polymer masterbatch. To 72 parts by weight of the masterbatch was added 23 parts by weight of a polyisobutylene concentrate containing 65% polyisobutylene and 35% polypropylene; and 5 parts by weight of ethylene butene-1 copolymer containing 90% ethylene. The resulting mixture of pellets is 56% by weight polypropylene, 24% high density polyethylene, 15% polyisobutylene, and 5% of an ethylene butene-1 copolymer containing 90% ethylene. The two outer layers of the 3-layer structure are polypropylene copolymer containing 2.7% ethylene. The interior, 4-component mixture layer is 0.025 mm. thick. The two outer layers are each about 0.012 mm. thick.

The sheet materials so made in the above EXAMPLES all have improved impact tolerance as compared to similar sheet materials, but lacking the modifying materials providing the elastomeric properties in the impact layer, especially where the modifying materials themselves exhibit elastomeric properties.

The sheet materials of EXAMPLE 2 are used to fabricate lids for preformed trays as seen in FIG. 2, wherein the trays have a sealing surface comprising polypropylene. Closed and sealed packages are formed by fabricating heat seals wherein the sheet material of the lid is sealed to the flanges of the trays as illustrated in FIG. 2.

The films of Example 1 and Comparative Example 1 are used to provide a closure lid for sealing to semi-rigid trays such as is illustrated as tray 2 in FIG. 2. The tray flange 3, to which the subject lid material is sealed, is about 1.3 mm thick, with a sealing surface layer about 0.25 mm. thick and having a composition comprising a blend of 60%, polypropylene and 40% high density polyethylene. At the outer periphery, the trays are about 159 mm. long by about 114 mm. wide.

Before formation of the heat seal, to close the package, as seen in FIG. 2, 340 milliliters of water are inserted into the tray as content. Finally the lid is applied, and sealed to the tray to form the closed and sealed package. The closed and sealed packages are retort processed at 121° C. with about 1.75 kg/cm$^2$ of pressure for 30 minutes of cook time followed by 20 minutes of cooling. Come-up time is 15 minutes.

The thus processed sealed packages are subjected to the standard USDA Immediate Container Abuse Test, without overwrap, using a standard drop chute apparatus. This test is intended to simulate dropping of individual packages on a controlled, reproducible basis.

The chute is inclined at an angle of 15° from the vertical and has a rigid base plate at a 90° angle to the chute, also the direction of fall. The chute itself has guide rods or iron corner guides, continuous from the top release point of contact to the base. The chute is fitted with a package release mechanism.

Each package is dropped twice, first on its longer side, and then on its shorter end. The packages impact the rigid base with an impact of about 35 cm. kg.

Packages representing Comparative Example 1 and Example 1 are drop tested in the manner described above. Overall, 0% out of 35 packages of Comparative Example 1 so tested survive both drops intact, whereas 23% out of 53 packages of Example 1 so tested survive both drops intact. Failures typically occur by splitting of the lid at the inner sealant junction.

The test results show that the sheet materials of the invention have better survival rates than sheet materials without the herein recited impact layer between the sealant structure and the substrate structure. Thus, the results show that the film structures of the invention yield closed packages having improved impact tolerance.

The sheet materials of this invention are highly desirable for use as closure members on packages having other sheet structures such as that seen in FIG. 2, wherein the sheet material 10 of the invention are used to provide lids on otherwise formed receptacles 2. Thus are the sheet materials of the invention highly adapted and highly satisfactory for use as lid stock in preformed trays as seen in FIG. 2.

The sheet materials of the invention are also highly satisfactory for use in fabrication of pouches, wherein the films of the invention comprise essentially all of the wall area of the package structure as seen in FIG. 3. The FIG. 3 illustration shows the package opened on one end for the insertion of the product after which a corresponding heat seal is used to close that open end to complete closure of the package.

For the sheet materials of the invention as illustrated in FIGS. 4–15, the overall sheet material thickness is typically of the order 0.04–0.50 mm., preferably about 0.06–0.40 mm. thick, most preferably about 0.10–0.30 mm.

The temperature of seal equipment applied to the outer layer of the sheet material varies, depending on, among other things, the compositions of especially the outer layer of substrate 16 which contacts the seal equipment, and the seal layer as at 14 which forms the seal. Conventional amounts of seal pressure usually are in the range of 2.8 kg/cm$^2$ to 6.3 kg/cm$^2$, and commonly 2.8 Kg/cm$^2$ to 4.2 Kg/cm$^2$. Typical dwell time is 0.25 to 2.0 seconds, more commonly 1–1.5 seconds. The seal conditions, of course, depend on the specific substructure 16 selected for a given embodiment.

Thus it is seen that the invention provides an improved multiple layer sheet material having a substrate substructure in combination with a sealant substructure, and an elastomer-modified impact layer between the sealant substructure and the substrate substructure. The improved multiple layer sheet materials have increased impact tolerance as compared to those sheet materials which do not include the impact component which provides the elastomeric properties. The improved multiple layer sheet materials provide increased impact tolerance in a package while maintaining the ability in the sheet materials to form strong heat seals.

Those skilled in the art will now see that certain modifications can be made to both the compositions of the layers and to the layer structuring without departing from the spirit of the invention. And while the invention has been described above with respect to its preferred embodiments, it will be understood that the invention is capable of numerous rearrangements, modifications, and alterations and all such arrangements, modifications, and alterations are intended to be within the scope of the appended claims.

Having thus described the invention, what is claimed is:

1. A multiple layer sheet material, comprising:
   (a) a first sealing layer comprising 65% to 95% by weight of a propylene polymer and 35% to 5% by weight of an ethylene polymer having a density of at least 0.930;
   (b) a second substrate structure; and
   (c) an impact layer disposed between said first sealant layer and said second substrate structure,
   the composition of said first sealant layer being adapted to provide a peelable heat seal.

2. A multiple layer sheet material, comprising:
   (a) a first sealant layer comprising polypropylene;
   (b) a second substrate structure; and
   (c) an impact layer disposed between said first sealant layer and said second substrate structure, the composition of said impact layer comprising (i) a first component including a polypropylene polymer and (ii) as a second component, an ethylene butene-1 copolymer containing 85% to 95% ethylene and providing elastomeric properties to said impact layer.

3. A multiple layer sheet material, comprising:
   (a) a first sealant layer comprising polypropylene;
   (b) a second substrate structure; and
   (c) an impact layer disposed between said first sealant layer and said second substrate structure, the composition of said impact layer comprising (i) a first component including a polypropylene polymer, (ii) as a second component, a first polymeric composition providing elastomeric properties to said impact layer, and (III) as a third component, a second polymeric composition providing elastomeric properties to said impact layer, said second and third components being different from each other.

4. A multiple layer sheet material as in claim 2 wherein said first sealant layer comprises a combination of polypropylene and a polyethylene having a density of at least about 0.930.

5. A multiple layer sheet material as in claim 3 wherein said first sealant layer comprises a combination of polypropylene and a polyethylene having a density of at least about 0.930.

6. A multiple layer sheet material as in claim 1 wherein said sealant layer comprises, as a third component, an ethylene butene-1 copolymer.

7. A multiple layer sheet material as in claim 4 wherein said sealant layer comprises, as a third component, an ethylene butene-1 copolymer.

8. A multiple layer sheet material as in claim 5 wherein said sealant layer comprises, as a third component, an ethylene butene-1 copolymer.

9. A multiple layer sheet material as in claim 1 wherein said sheet material has an overall oxygen transmission rate of no more than about 5 cc/m$^2$ day at 23° C., 0% relative humidity.

10. A multiple layer sheet material as in claim 2 wherein said sheet material has an overall oxygen transmission rate of no more than about 5 cc/m$^2$ day at 23° C., 0% relative humidity.

11. A multiple layer sheet material as in claim 3 wherein said sheet material has an overall oxygen transmission rate of no more than about 5 cc/m$^2$ day at 23° C., 0% relative humidity.

12. A multiple layer sheet material as in claim 4 wherein said sheet material has an overall oxygen transmission rate of no more than about 5 cc/m$^2$ day at 23° C., 0% relative humidity.

13. A multiple layer sheet material as in claim 5 wherein said sheet material has an overall oxygen transmission rate of no more than about 5 cc/m$^2$ day at 23° C., 0% relative humidity.

14. A multiple layer sheet material as in claim 6 wherein said sheet material has an overall oxygen transmission rate of no more than about 5 cc/m$^2$ day at 23° C., 0% relative humidity.

15. A multiple layer sheet material as in claim 7 wherein said sheet material has an overall oxygen transmission rate of no more than about 5 cc/m$^2$ day at 23° C., 0% relative humidity.

16. A multiple layer sheet material as in claim 8 wherein said sheet material has an overall oxygen transmission rate of no more than about 5 cc/m$^2$ day at 23° C., 0% relative humidity.

17. A multiple layer sheet material as in claim 1 wherein said sheet material has an overall moisture vapor transmission rate of no more than about 2 cc/m$^2$ at 100% relative humidity.

18. A multiple layer sheet material as in claim 2 wherein said sheet material has an overall moisture vapor transmission rate of no more than about 2 cc/m$^2$ day at 100% relative humidity.

19. A multiple layer sheet material as in claim 3 wherein said sheet material has an overall moisture vapor transmission rate of no more than about 2 cc/m$^2$ day at 100% relative humidity.

20. A multiple layer sheet material as in claim 4 wherein said sheet material has an overall moisture vapor transmission rate of no more than about 2 cc/m$^2$ day at 100% relative humidity.

21. A multiple layer sheet material as in claim 5 wherein said sheet material has an overall moisture vapor transmission rate of no more than about 2 cc/m$^2$ day at 100% relative humidity.

22. A multiple layer sheet material as in claim 6 wherein said sheet material has an overall moisture vapor transmission rate of no more than about 2 cc/m$^2$ day at 100% relative humidity.

23. A multiple layer sheet material as in claim 7 wherein said sheet material has an overall moisture vapor transmission rate of no more than about 2 cc/m$^2$ day at 100% relative humidity.

24. A multiple layer sheet material as in claim 8 wherein said sheet material has an overall moisture vapor transmission rate of no more than about 2 cc/m$^2$ day at 100% relative humidity.

25. A multiple layer sheet material as in claim 1 wherein said substrate structure comprises a fibrous layer.

26. A multiple layer sheet material as in claim 2 wherein said substrate structure comprises a fibrous layer.

27. A multiple layer sheet material as in claim 3 wherein said substrate structure comprises a fibrous layer.

28. A multiple layer sheet material as in claim 4 wherein said substrate structure comprises a fibrous layer.

29. A multiple layer sheet material as in claim 5 wherein said substrate structure comprises a fibrous layer.

30. A multiple layer sheet material as in claim 6 wherein said substrate structure comprises a fibrous layer.

31. A multiple layer sheet material as in claim 7 wherein said substrate structure comprises a fibrous layer.

32. A multiple layer sheet material as in claim 18 wherein said substrate structure comprises a fibrous layer.

33. A multiple layer sheet material as in claim 25 and including, between said sealant sheet structure and said impact layer, an oxygen barrier layer, whereby said sheet material has an overall oxygen transmission rate of no more than about 2 cc/m$^2$ day at 23° C. and 0% relative humidity.

34. A multiple layer sheet material as in claim 26 and including, between said sealant sheet structure and said impact layer, an oxygen barrier layer, whereby said sheet material has an overall oxygen transmission rate of no more than about 2 cc/m$^2$ day at 23° C. and 0% relative humidity.

35. A multiple layer sheet material as in claim 27 and including, between said sealant sheet structure and said impact layer, an oxygen barrier layer, whereby said sheet material has an overall oxygen transmission rate of no more than about 2 cc/m$^2$ day at 23° C. and 0% relative humidity.

36. A multiple layer sheet material as in claim 28 and including, between said sealant sheet structure and said impact layer, an oxygen barrier layer, whereby said sheet material has an overall oxygen transmission rate of no more than about 2 cc/m$^2$ day at 23° C. and 0% relative humidity.

37. A multiple layer sheet material as in claim 29 and including, between said sealant sheet structure and said impact layer, an oxygen barrier layer, whereby said sheet material has an overall oxygen transmission rate of no more than about 2 cc/m$^2$ day at 23° C. and 0% relative humidity.

38. A multiple layer sheet material as in claim 30 and including, between said sealant sheet structure and said impact layer, an oxygen barrier layer, whereby said sheet material has an overall oxygen transmission rate of no more than about 2 cc/m$^2$ day at 23° C. and 0% relative humidity.

39. A multiple layer sheet material as in claim 31 and including, between said sealant sheet structure and said impact layer, an oxygen barrier layer, whereby said sheet material has an overall oxygen transmission rate of no more than about 2 cc/m$^2$ day at 23° C. and 0% relative humidity.

40. A multiple layer sheet material as in claim 32 and including, between said sealant sheet structure and said impact layer, an oxygen barrier layer, whereby said sheet material has an overall oxygen transmission rate of no more than about 2 cc/m$^2$ day at 23° C. and 0% relative humidity.

41. A multiple layer sheet material as in claim 1 wherein said substrate structure comprises polyethylene terephthalate.

42. A multiple layer sheet material as in claim 2 wherein said substrate structure comprises polyethylene terephthalate.

43. A multiple layer sheet material as in claim 3 wherein said substrate structure comprises polyethylene terephthalate.

44. A multiple layer sheet material as in claim 6 wherein said substrate structure comprises polyethylene terephthalate.

45. A multiple layer sheet material as in claim 1 wherein said substrate structure comprises a polymer selected from the group consisting of amide polymer, amide copolymers and acrylonitrile polymers and copolymers.

46. A multiple layer sheet material as in claim 2 wherein said substrate structure comprises a polymer selected from the group consisting of amide polymer, amide copolymer and acrylonitrile polymers and copolymers.

47. A multiple layer sheet material as in claim 3 wherein said substrate structure comprises a polymer selected from the group consisting of amide polymer, amide copolymer and acrylonitrile polymers and copolymers.

48. A multiple layer sheet material as in claim 4 wherein said substrate structure comprises a polymer selected from the group consisting of amide polymer, amide copolymer and acrylonitrile polymers and copolymers.

49. A multiple layer sheet material as in claim 5 wherein said substrate structure comprises a polymer selected from the group consisting of amide polymer, amide copolymer and acrylonitrile polymers and copolymers.

50. A multiple layer sheet material as in claim 7 wherein said substrate structure comprises a polymer selected from the group consisting of amide polymer, amide copolymer and acrylonitrile polymers and copolymers.

51. A multiple layer sheet material as in claim 8 wherein said substrate structure comprises a polymer selected from the group consisting of amide polymer, amide copolymer and acrylonitrile polymers and copolymers.

52. A multiple layer sheet material as in claim 1 wherein said substrate structure comprises a polycarbonate.

53. A multiple layer sheet material as in claim 2 wherein said substrate structure comprises a polycarbonate.

54. A multiple layer sheet material as in claim 3 wherein said substrate structure comprises a polycarbonate.

55. A multiple layer sheet material as in claim 4 wherein said substrate structure comprises a polycarbonate.

56. A multiple layer sheet material as in claim 5 wherein said substrate structure comprises a polycarbonate.

57. A multiple layer sheet material as in claim 6 wherein said substrate structure comprises a polycarbonate.

58. A multiple layer sheet material as in claim 7 wherein said substrate structure comprises a polycarbonate.

59. A multiple layer sheet material as in claim 8 wherein said substrate structure comprises a polycarbonate.

60. A multiple layer sheet material as in claim 1 wherein said substrate structure comprises a vinylidene chloride copolymer.

61. A multiple layer sheet material as in claim 2 wherein said substrate structure comprises a vinylidene chloride copolymer.

62. A multiple layer sheet material as in claim 3 wherein said substrate structure comprises a vinylidene chloride copolymer.

63. A multiple layer sheet material as in claim 6 wherein said substrate structure comprises a vinylidene chloride copolymer.

64. A package made with a sheet material of any one of claims 1-3, 4-21, 28, 36-43, 44-49, 50-54, 55-62, or 63.

* * * * *